United States Patent
Harper et al.

(10) Patent No.: US 7,178,588 B2
(45) Date of Patent: Feb. 20, 2007

(54) FLEXIBLE CUP FOR DOWNHOLE DEVICES

(76) Inventors: Tom Harper, 73600 Highway 437, Covington, LA (US) 70435; James Rick Stewart, 403 Stephanie Ave., Lafayette, LA (US) 70503; David Hutchinson, 115 Talbot Dr., Houma, LA (US) 70360; Terry DeRoche, Jr., 124 Fairmount Dr., Houma, LA (US) 70360; Larry J. Kirepel, 73600 Hwy. 437, Covington, LA (US) 70435

( * ) Notice: Subject to any disclaimer, the term of this patent is extended or adjusted under 35 U.S.C. 154(b) by 127 days.

(21) Appl. No.: 10/842,374

(22) Filed: May 10, 2004
(Under 37 CFR 1.47)

(65) Prior Publication Data

US 2005/0247448 A1    Nov. 10, 2005

(51) Int. Cl.
*E21B 33/126* (2006.01)
(52) U.S. Cl. ................................... 166/202
(58) Field of Classification Search ........ 166/202, 166/133.1, 77.3, 153; 428/545; 427/135
See application file for complete search history.

(56) References Cited

U.S. PATENT DOCUMENTS

| | | | | |
|---|---|---|---|---|
| 2,672,199 A | * | 3/1954 | McKenna | 277/335 |
| 2,691,418 A | * | 10/1954 | Connolly | 166/129 |
| 4,071,086 A | * | 1/1978 | Bennett | 166/66.5 |
| 2002/0108751 A1 | * | 8/2002 | Simpson | 166/212 |
| 2004/0118565 A1 | * | 6/2004 | Crawford | 166/312 |

\* cited by examiner

*Primary Examiner*—David Bagnell
*Assistant Examiner*—Daniel P Stephenson
(74) *Attorney, Agent, or Firm*—Garvey, Smith, Nehrbass & North, L.L.C.; Gregory C. Smith

(57) ABSTRACT

An improved cup and method for making same for use on a "pig" or any other down hole equipment for engaging the wall of a pipe line, which comprises an inner metal sleeve portion; a metal shoulder portion extending outward from the sleeve around its perimeter extending into an angulated arm portion; a strong flexible material, such as polyurethane, molded onto an outer surface of the sleeve, and enveloping the metal shoulder and arm portion, the flexible material defining the outer body and cup portion of the improved cup, so that the metal shoulder and arm portion enveloped by and integral to the cup portion provides additional support to the flexible material to prevent deformation of other damage to the circular cup as it would be positioned on the "pig" body or other down hole device. The improved cup would be formed by placing the metal sleeve with the shoulder and arm member into a mold; pouring the plastic-type polyurethane material into the mold, so that upon curing, the plastic-type material adheres to an outer surface of the sleeve and completed envelopes the shoulder and arm portion of the cup; allowing the plastic-type material to cure; and removing the composite cup from the mold to be positioned onto the body of a pig or other device for use down hole.

7 Claims, 4 Drawing Sheets

FLEXIBLE CUP FOR DOWNHOLE DEVICES

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Technical Field of the Invention

The apparatus of the present invention relates to flexible cups utilized on downhole devices such as "pigs," in a pipeline. More particularly, the present invention relates to an improved flexible cup, of the type used on "pigs" and other devices moved down the interior of a pipe line which are stronger and able to withstand high pressure thrusts against the device without deforming the flexible cups.

2. General Background of the Invention

When drilling for and producing subterranean oil and gas deposits and seeking out other energy sources, it is necessary to drill vertical, horizontal, curved or a combinations of such boreholes, and then to insert an elongated tube from the surface deep into a pipe or the open hole. Such drilled holes may be part of, for example, a well, pipe line, production line, or drill pipe, depending on the circumstances. Quite often it is necessary to insert a tube, whether it be continuous or segmented into the pipe or open hole, the tube having a diameter smaller than the diameter of the drill, production pipe or open hole, in order to remove or destroy blockages which have formed in the pipe or drilled hole.

It has become very beneficial in the cleaning or clearing of pipelines, or horizontal holes to utilize a continuous tubing, referred to as coiled tubing. The tubing is usually injected type tubing which is relatively flexible, and is of a continuous length being rolled off a large reel at the rig site and down hole. Various types of tools may be connected to the end of the coiled tubing to undertake whatever task is required below the surface. Coil tubing strings can be joined together up to and exceeding ten miles at a time.

When coil tubing is used in this manner, it is common that a "pig" will be placed at the end of the coil tubing. A pig is a device which is used to clear the passage within the pipeline. The pig is normally equipped with a plurality of cups around it perimeter, the circular cups being substantially the same of slightly less diameter than the interior of the pipeline, so that the cups make contact with the inner wall-of the pipeline as the pig is either forced along with fluid pressure or pull or pushed through the pipe line. Although, these cups are constructed of a strong, but flexible material, such as polyurethane, it has been found that due to the high pressures used, the cups may deform and lose their integrity within the pipeline, and not be effective in maintaining contact with the pipeline wall. Therefore, it would be beneficial to have a cup which may be constructed so as to withstand the high pressure from in front of or behind the cup, so that the cup is not deformed or damaged under high pressure conditions. Such cups, although quite common in "pigs," may be used on a number of downhole devices in order to seal against the wall of the pipe as the device moves down the pipe. It should be made clear that although there has been a discussion of "pigs" being utilized at the end of coil tubing, it is quite common for "pigs" to be sent down a bore hole through various other means, and the present invention is as equally applicable to those types of "pig."

Applicant is submitting herewith an information disclosure statement which includes additional prior art that applicant is aware of at this time.

BRIEF SUMMARY OF THE INVENTION

The present invention solved the problems in the art in a simple and straight forward manner. What is provided is an improved cup and method for making same for use on a "pig" or any other downhole equipment for engaging the wall of a pipe line, which comprises an inner metal sleeve portion; a metal arm or flange portion extending outward from the sleeve around its perimeter extending into an angulated arm portion, the metal arm having a plurality of perforations through its entirety; a strong flexible material, such as polyurethane, molded onto an outer surface of the sleeve, and enveloping the metal shoulder and arm portion, the flexible material defining the outer body and cup portion of the improved cup, so that the metal shoulder and arm portion enveloped by and integral to the cup portion provides additional support to the flexible material to prevent deformation of other damage to the circular cup as it would be positioned on the "pig" body or other downhole device. The improved cup would be formed by placing the metal sleeve with the shoulder and arm member into a mold; pouring the plastic-type polyurethane material into the mold, so that the material flows through the penetrations of the arm member, and upon curing, the plastic-type material adheres to an outer surface of the sleeve and completed envelopes the shoulder and arm portion of the cup; allowing the plastic-type material to cure; and removing the composite cup from the mold to be positioned onto the body of a pig or other device for use downhole.

Therefore, it is the principal object of the present invention to provide an improved cup for use on a "pig" or other device which incorporates an internal metal support member as part of the circular wing of the cup;

It is a further object of the present invention to provide a process for molding a cup used on a "pig" or other device which allows a plastic-type material to be poured into the mold and adhere to a metal sleeve having a metal shoulder and arm which forms part of the wing of the cup when the cup is completed cured;

It is a further object of the present invention to provide a reinforced cup for a downhole device such as a "pig" which reduces or eliminates any deformation of the cup that would result in a malfunction of the cup during use of the "pig" or other downhole device.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE PREFERRED EMBODIMENTS

FIGS. 1–6 illustrate the preferred embodiment of the improved cup of the present invention, and the process of fabricating same. Prior to a discussion of the assembled or fabricated cup of the present invention, reference is made to FIGS. 1–3 which illustrate the steps in the process of fabricating the composite cup that is the subject of the present invention.

Figure 1:
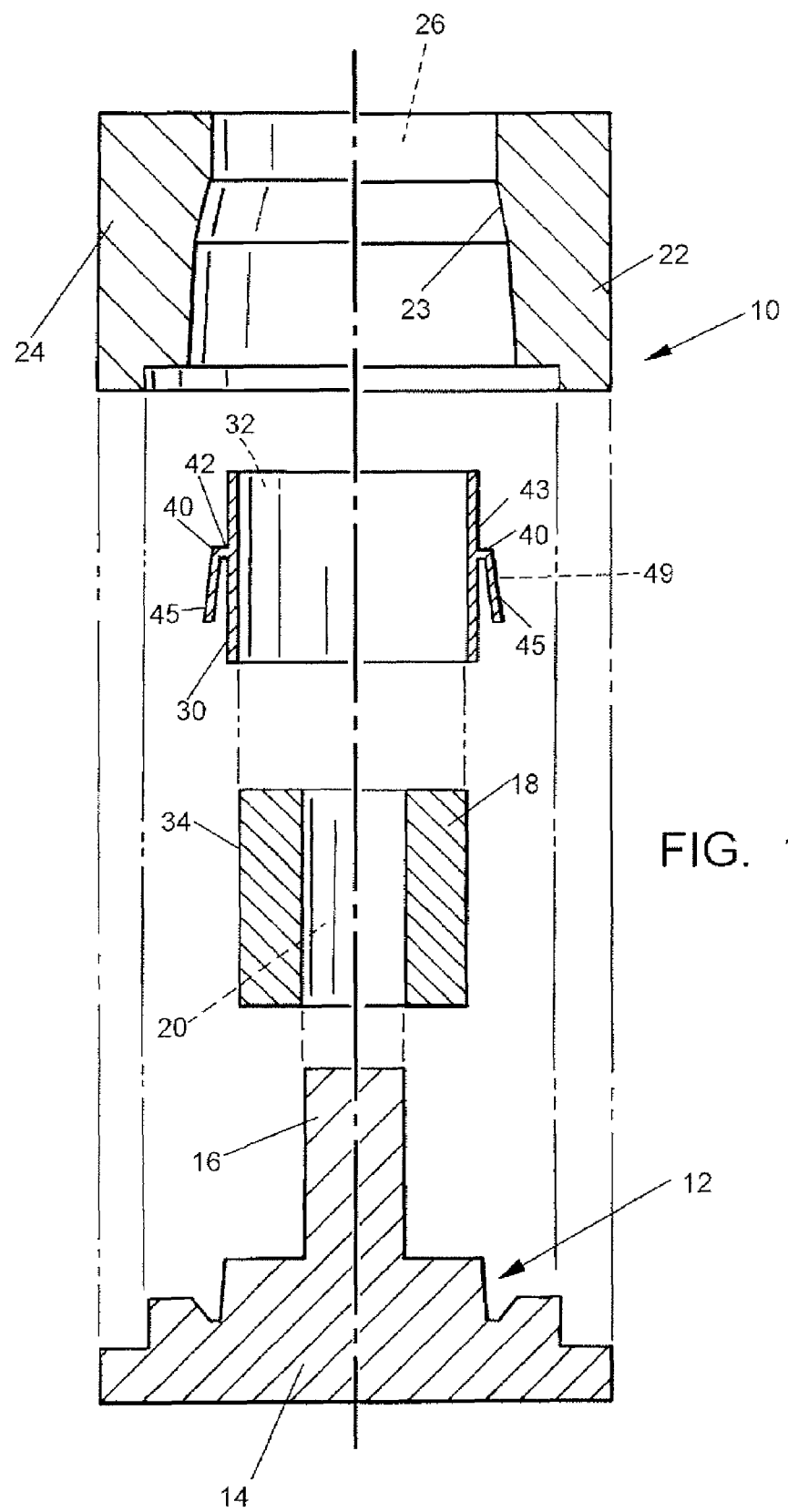
FIG. 1 illustrates an overall exploded view of the mold used in the process of the present invention.

Turning now to FIG. 1 there is illustrated an exploded view of mold 10 which comprises a lower body portion 12 having a base 14 and a central circular post member 16 extending upward from the base 14. This type of mold is a typical type of mold which is utilized in the fabrication of items which are constructed of a plastic type material such as polypropylene or polyurethane for use in various applications. Continuing to refer to FIG. 1, there is illustrated a circular body portion 18 of the mold having an interior circular space 20, which would be accommodated onto the post 16. The third portion of the mold contains the outer circular body member 22 which has a circular mold wall portion 24, and an interior opening 26 as will be discussed further.

Figure 2:
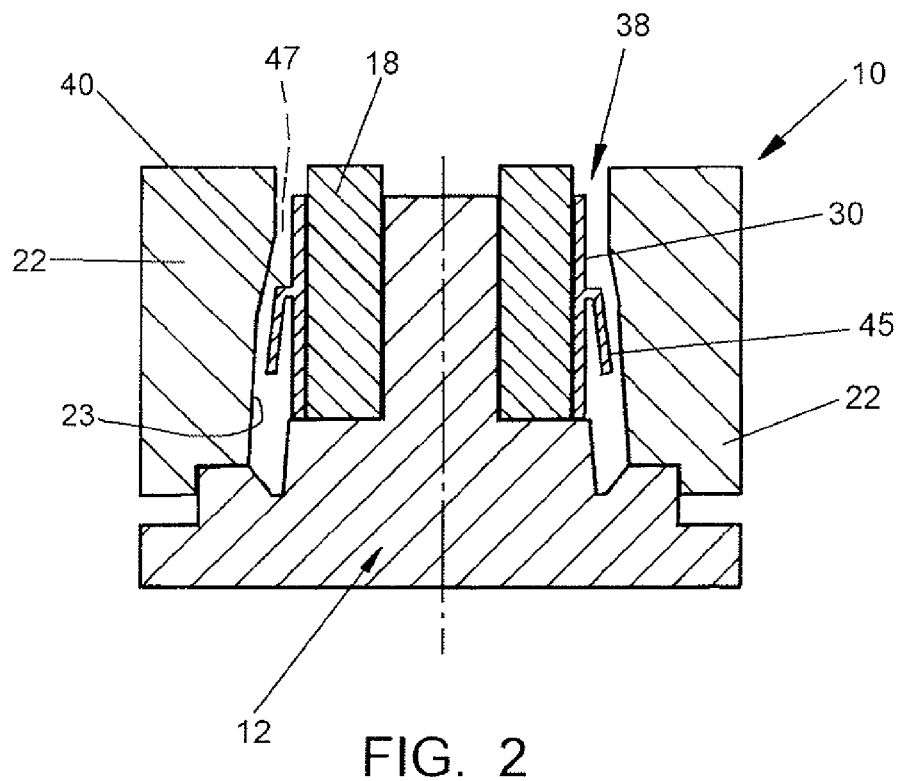
FIG. 2 illustrates a cross-section view of the mold housing the metal portion of the improved cup of the present invention.

As further illustrated in FIG. 1, there is illustrated a circular metal sleeve 30, which is a sleeve which will become a very component of the composite cup that will be discussed further. As is illustrated the sleeve 30 has a central opening 32 so that when sleeve 30 is placed upon the mold, the body portion 18 is slid onto the post 16. The sleeve 30 would be accommodated along the outer wall 34 of the body member 18, and the upper body portion 22 of the mold 10 would be set thereupon. As shown in FIG. 2, the assembled mold 10 housing the sleeve 30 is ready to accept the plastic-type material which would be poured into the space 38 during the fabrication of the composite cup that we will discuss further.

Prior to a discussion of the process, reference is again is made to the metal sleeve 30 as seen in exploded view in FIG. 1, and as it is set within mold 10 in FIG. 2. As was stated earlier, sleeve 30 is a circular sleeve of a hard metal, such as steel or the like, having an opening 32 within. As further illustrated, sleeve 30 includes a shoulder member 40, which is attached at point 42 to the outer wall 43 of the sleeve and extending outward from the wall 43. There is then provided an arm 45 extending at an angle away from shoulder 40, and projecting therefrom throughout the entire circumferential surface of the wall 43 of sleeve 30. As illustrated the surface of the arm 45 would include a plurality of perforations 49. Again, the shoulder 40 and arm 45 are constructed of the same type metal, such as steel, as the sleeve 30, and is firmly in position to serve as a means for supporting the cup as will be discussed further. Again, as seen in FIG. 2, the sleeve 30 is resting within mold 10, wherein there is an opening 47 defined between the outer wall of the sleeve and the inner surface 23 of the body portion 22.

Figure 3:
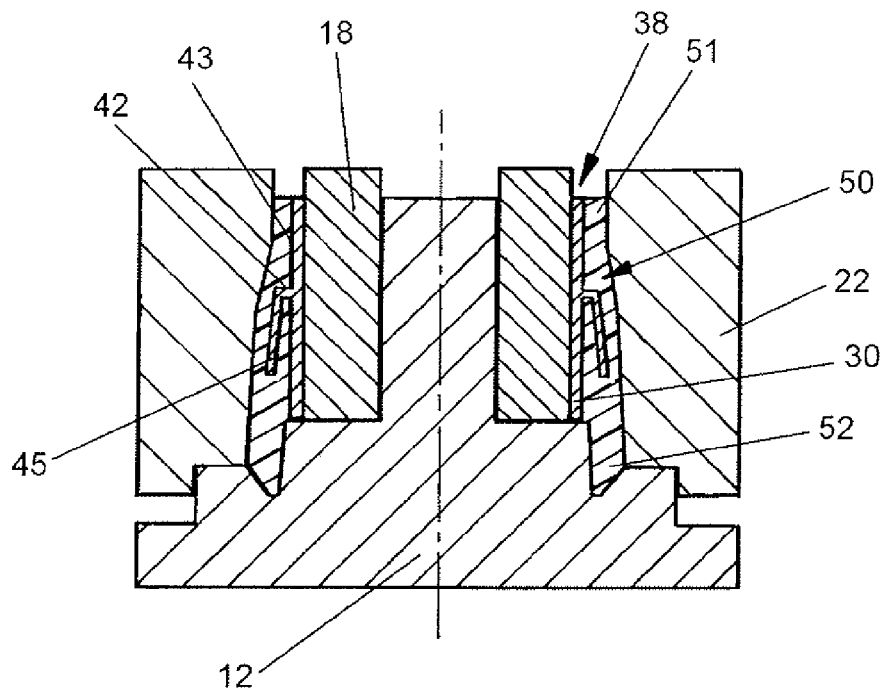
FIG. 3 illustrates a cross-section view of the mold housing the plastic-type material adhering to the metal portion of the improved cup of the present invention.

Turning now to FIG. 3, as was discussed earlier, the plastic-type material 51 in substantially a liquid form has been poured into the space 47 and would in effect adhere, through an adhesive or the like, to the outer wall 43 of sleeve 30 on the outside and will completely engulf the entire shoulder 40 and arm 45 of the sleeve 30. The plastice-type material 51, when engulfing shoulder 40 and arm 45 would flow through the plurality of perforations 49 so as to form a greater cohesiveness between the material 51 and the sleeve 30. The combination of the plastic-type material 51 molded to the metal sleeve 30 would then define a composite cup 50, comprising the inner sleeve 30, the shoulder 40 and arm 45, completely engulfed by the circular polyurethane material 51. For purposes of definition, "plastic-type" material may be any flexible material, capable of being molded onto metal, which can withstand high pressure, intense heat, or contact with materials such a paraffin or the like that might otherwise damage such a material. The plastic-type material would preferably be selected from a group including plastic, polyurethane, polypropylene or polyethylene materials. These terms may be used interchangeably throughout this specification.

The plastic-type material, once cured in the mold, would define on its lower end a type of circular wing portion 52, the purpose of which will be discussed further. Of course, as in all molding processes after the polyurethane material has cured, then the composite metal/polyurethane cup 50 would be removed from the mold 10 and would be ready to be utilized as part of a device such as a down hole pig.

Figures 4, 5:
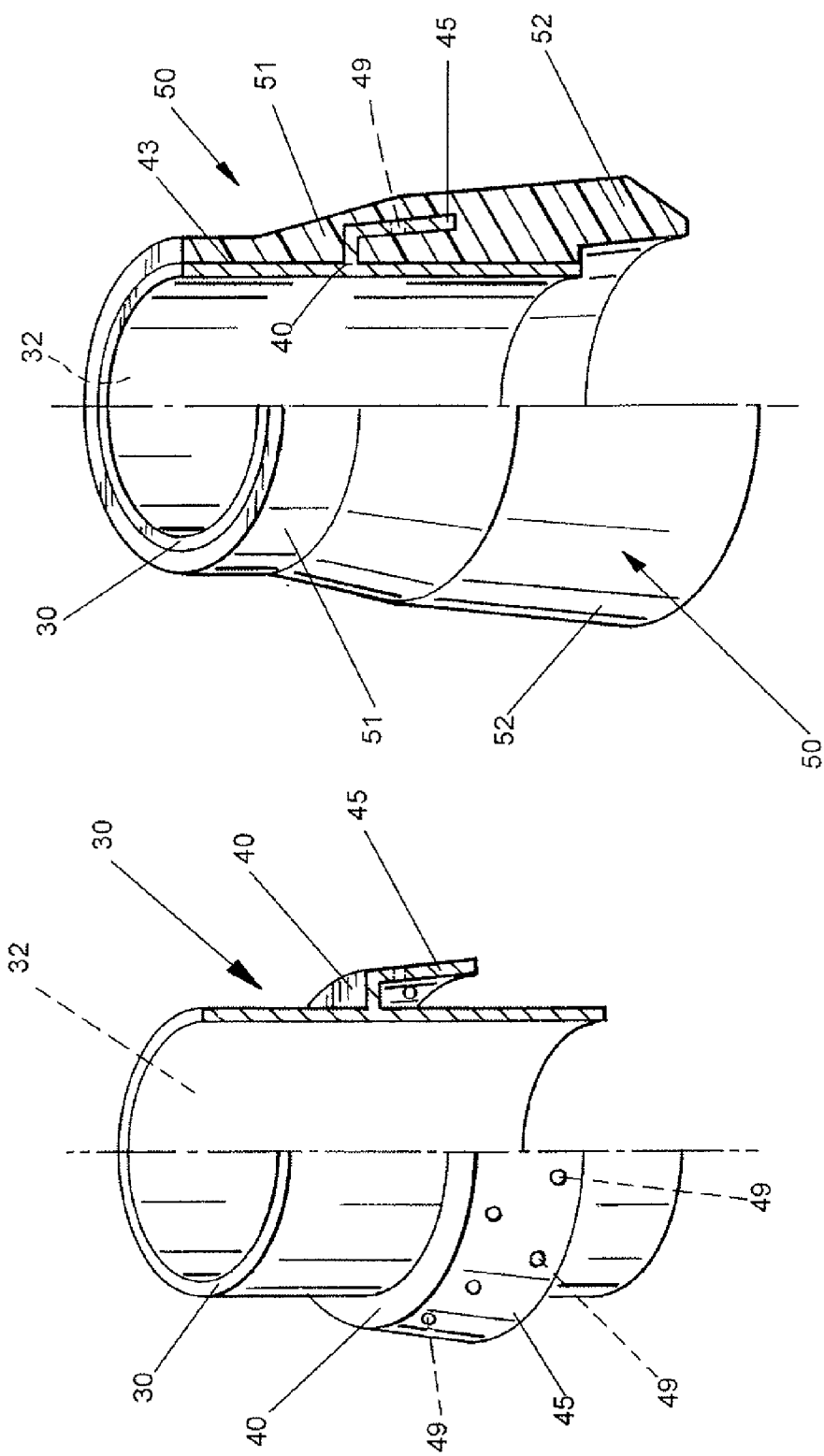
FIG. 4 illustrates an overall cutaway view of the metal portion of the improved cup of the present invention.
FIG. 5 illustrates an overall cutaway view of the complete assembly of the improved cup of the present invention.

Reference is made first to FIG. 4 where there is illustrated the partial cutaway view of the inner metal sleeve 30 with a shoulder portion 40 attached thereto and the arm member 45 extending therefrom, prior to being molded into the composite cup 50. Whereas, as seen in FIG. 5, the composite cup 50 is illustrated in partial cutaway view, where the plastic-type or polyurethane material 51 has been molded onto the outer wall 43 of the sleeve 30, enveloping the shoulder 43 and arm 45, and forming the composite cup 50 for use on the pig.

It should be noted that the inner sleeve 30 is formulated in such a manner to include the shoulder 43 and arm 45 so that the shoulder 43 and arm 45 serve as a means to provide greater structural integrity to the cup 50, when being used on a pig, to reduce or eliminate altogether the possibility that the cup 50, when subjected to very high pressures in the pipeline, would become deformed when used on a pig or other device down a borehole. Furthermore, the inclusion of the perforations 49 through the arm 45 would allow greater penetration and adhesion of the material 51 to the metal sleeve 30 to form the composite cup 50.

Figure 6:
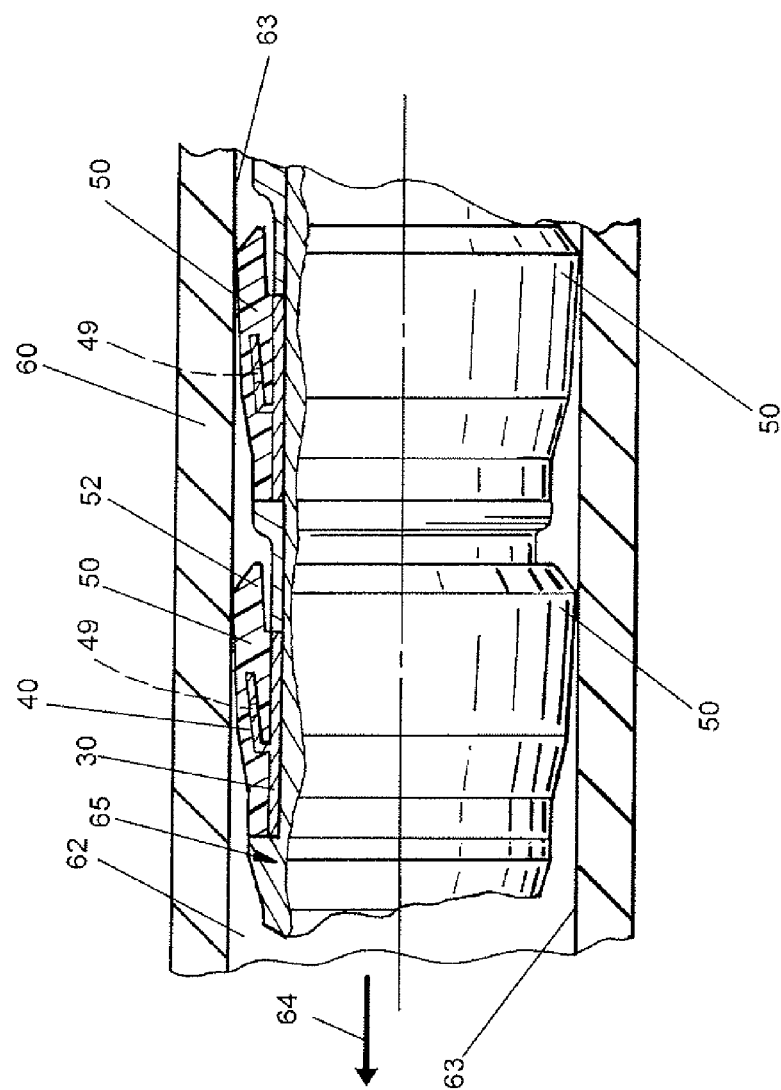
FIG. 6 illustrates the improved cup of the present invention positioned on a "pig" or other device within a pipe line.

Lastly, as seen in FIG. 6, there is illustrated a pipeline 60 having an interior flow bore 62 wherein there is illustrated a "pig" 65 or other similar type down hole device, having a pair of cups 50 which in theory have been placed in position around the exterior wall of a device, such as a "pig," so that the circular cups 50 would make contact with the inner surface 63 of the pipeline wall. Therefore, when fluid pressure would be placed on either end of the pig or device 65, the cups contacting the wall of the pipeline 60 would then allow the device 65 to move within the pipeline as, for example, in the direction of arrow 64. As illustrated in side view and partial cutaway view in FIG. 6, one can see the upper "wing" portion of the cups making contact with the pipeline wall 63, with the shoulder 40 and arm 45 giving substantial support to the polypropylene body which would normally be quite flexible. Of course in the lower portion of the non cutaway view there is simply illustrated the cup 50 without any illustration of the interior composite view of the sleeve and wing as was discussed earlier.

In this manner, with improved cups which have been fabricated in this manner are utilized it is foreseen that these cups although still somewhat flexible, would be able to withstand pressure forces that may normally deform or damage a cup that is not reinforced with the metal shoulder 40 and arm 45 within the polyurethane cup 50. When that plastic-type material would be utilized in combination with the metal sleeve and the shoulder and arm portion embedded within the plastic-type material, then this combination affords a circular cup that is substantially stronger and capable of withstanding even greater pressures. Although the use of the cup is certainly very important in combination with the pig as was discussed earlier, it is foreseen that such circular cups could be placed on any type of a device which goes within the interior of a pipeline and which may utilize such a cup for various reason and would want the cup to withstand pressures and maintaining its structural integrity during use.

PARTS LIST

The following is a list of parts and materials suitable for use in the present invention:

| Description | Number |
|---|---|
| mold | 10 |
| lower body portion | 12 |
| base | 14 |
| post member | 16 |
| circular body portion | 18 |
| circular space | 20 |
| outer body member | 22 |
| inner surface | 23 |
| wall portion | 24 |
| interior opening | 26 |
| metal sleeve | 30 |
| opening | 32 |
| outer wall | 34 |
| space | 38 |
| shoulder member | 40 |
| outer wall | 43 |
| arm | 45 |
| opening | 47 |
| perforations | 49 |
| composite cup | 50 |
| plastic type material | 51 |
| wing portion | 52 |
| pipeline | 60 |
| flow bore | 62 |
| inner surface | 63 |
| arrow | 64 |
| "pig" or device | 65 |

The foregoing embodiments are presented by way of example only; the scope of the present invention is to be limited only by the following claims.

What is claimed is:

1. An improved circular cup for use on down hole devices, comprising:
   a. a metal sleeve portion, having an opening therethrough;
   b. an arm portion extending out from the metal sleeve portion, substantially around its entire circumference;
   c. a flexible material formed onto the sleeve portion to define a composite cup, the flexible material enveloping the arm portion so that the arm portion provides structural integrity to the flexible material when subjected to pressures in a pipe line or other down hole setting;
   d. wherein the arm portion further comprises a plurality of perforations therethrough so that the flexible material flows through the perforations resulting in greater adhesion between the sleeve and the flexible material.

2. The improved circular cup in claim 1, wherein the flexible material comprises a moldable material selected from a group including plastic, polyurethane, polypropylene or polyethylene materials.

3. The improved circular cup in claim 1, wherein the cup would be moldable and engaged around a pig or other down hole device in a pipe line.

4. The improved circular cup in claim 1, wherein the composite cup would contact an inner wall of the pipe line so that pressure placed on the cup would provide a force to move the device within the pipe line.

5. A composite cup for use on a pig or device, the cup of the type which would engage around the device and make contact with an inner wall of a pipe line, the composite cup comprising:
   a. a metal sleeve portion having a circular opening for sliding onto a pig or other device;
   b. a metal arm extending from an outer wall of the metal sleeve, and defining an angulated arm around the circumference of the sleeve;
   c. a flexible material, such a polyurethane, formed on the metal sleeve, and enveloping the metal arm, for defining the composite cup of greater structural integrity when subjected to pressures in a pipe line or other down hole setting positioned on a "pig" or other down hole device;
   d. wherein the metal arm further comprises a plurality of perforations therethrough so that the flexible material flows through the perforations resulting in greater adhesion between the sleeve and the flexible material.

6. The composite cup in claim 5, wherein the cup would be formed through a molding process.

7. An improved circular cup for use on down hole devices, comprising:
   a. a metal sleeve portion, having an opening therethrough;
   b. an arm portion extending out from the metal sleeve portion, substantially around its entire circumference;
   c. a flexible material formed Onto the sleeve portion to define a composite cup, the flexible material enveloping the arm portion so that the arm portion provides structural integrity to the flexible material when subjected to pressures in a pipe line or other down hole setting; and
   d. wherein the arm portion further comprises means for allowing greater adhesion between the sleeve and the flexible material which envelops the arm portion of the circular cup.

* * * * *